United States Patent [19]

Fox

[11] Patent Number: 5,787,085
[45] Date of Patent: Jul. 28, 1998

[54] DATA TRANSMISSION OPTIMIZATION SYSTEM AND METHOD

[75] Inventor: David L. Fox, Allen, Tex.

[73] Assignee: DSC Communications Corporation, Plano, Tex.

[21] Appl. No.: 574,549

[22] Filed: Dec. 19, 1995

[51] Int. Cl.⁶ .................................................. H04B 12/56
[52] U.S. Cl. ........................... 370/392; 370/411; 370/473
[58] Field of Search ................................ 370/380–385, 370/360, 392, 394, 389, 400, 411, 351, 473

[56] References Cited

U.S. PATENT DOCUMENTS

| | | | |
|---|---|---|---|
| 5,276,425 | 1/1994 | Swanson et al. | 340/826 |
| 5,436,890 | 7/1995 | Read et al. | 370/58.2 |
| 5,568,477 | 10/1996 | Galand | 370/60 |

OTHER PUBLICATIONS

"A Study of Non-Blocking Switching Networks," by Charles Cos, *Bell System Technical Journal*, Mar. 1953, pp. 406–423.

*Primary Examiner*—Douglas W. Olms
*Assistant Examiner*—Matthew C. Phillips
*Attorney, Agent, or Firm*—Baker & Botts, L.L.P.

[57] ABSTRACT

A system for optimizing data for transmission that includes a data collector operable to collect a plurality of data packets, wherein each data packet includes an address label, a data assembler operable to order the data packets by address label and assemble all data packets with a common address label into a single data block with a single address label, and a transmitter for transmitting the data blocks, wherein the transmitter is operable to broadcast the data blocks.

22 Claims, 5 Drawing Sheets

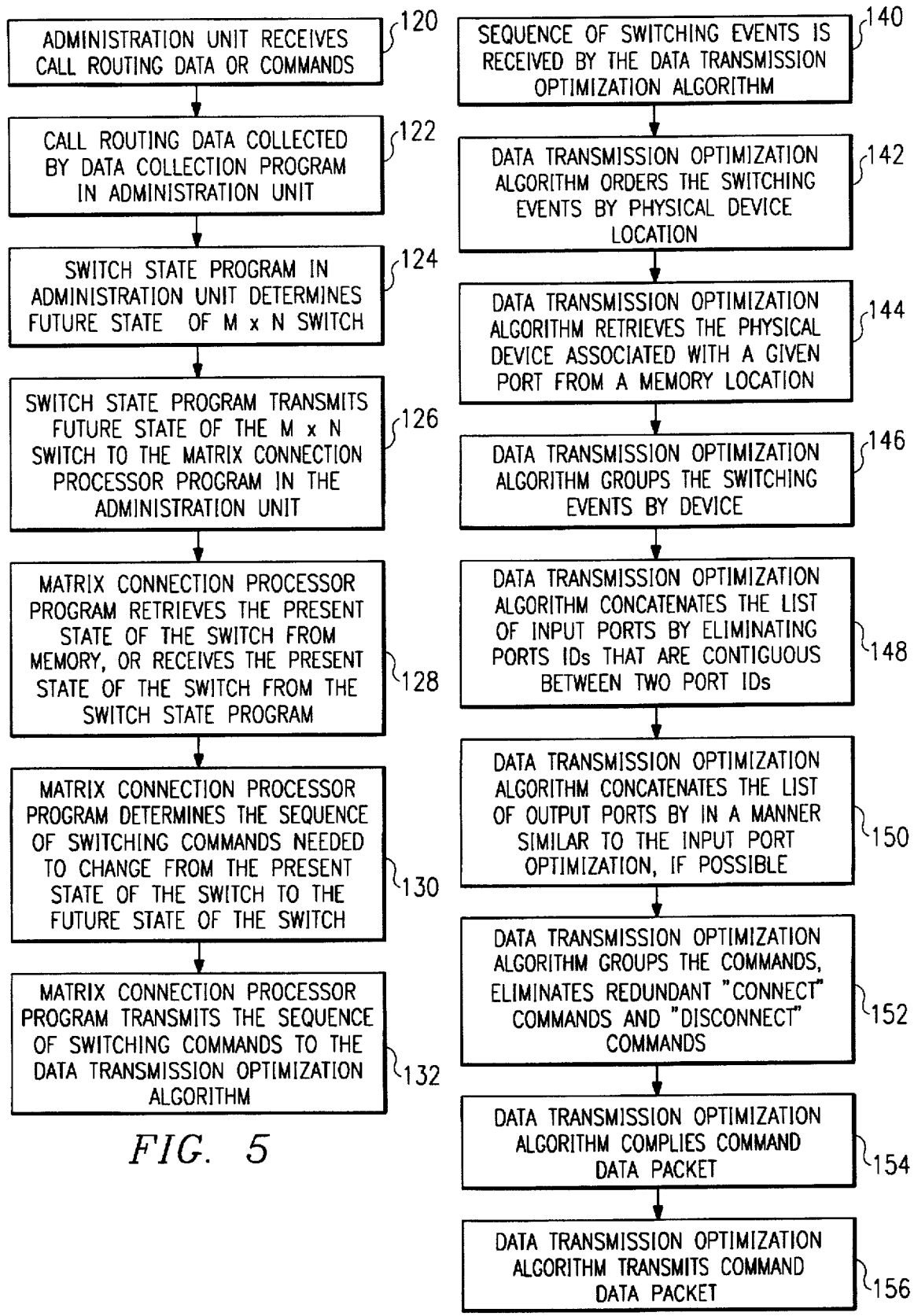

DATA TRANSMISSION OPTIMIZATION SYSTEM AND METHOD

TECHNICAL FIELD OF THE INVENTION

This invention relates in general to the field of data transmission, and more particularly to a system and method for data transmission optimization.

BACKGROUND OF THE INVENTION

In the field of telephone switching systems, modern systems typically include a common control section that manages the call connection process, and a switching matrix that makes the connections. The common control section typically includes such equipment as electronic hardware modules, digital switching components, and computer controls. The switching matrix typically includes an M×N switch having M input ports and N output ports and functional to connect any one of the M input ports to any one of the N output ports. The routing of calls through the switching matrix is accomplished by the common control section.

A digital cross-connect (DCC) system is a specialized switching system that provides improved flexibility in switching services. An example of a modern DCC system is provided by U.S. Pat. No. 5,436,890 to Read et al. (hereinafter "Read"), entitled "*Integrated Multirate Cross-Connect System*," assigned to DSC Communications Corporation, filed Dec. 30, 1993, application Ser. No. 176, 548, issued Jul. 25, 1995, and which is expressly incorporated by reference for all purposes herein. Such DCC systems include a plurality of devices that define the M input ports and N output ports, an M×N connection matrix switch operable to connect any of the M input ports to any of the N output ports, and an administration subsystem that provides synchronization, monitoring, and control for remapping of the connection matrix.

Despite the additional flexibility inherent in DCC systems, such systems are typically limited by the processing speed of the administration subsystem. Because the DCC systems typically include a plurality of physically separate devices that define the M×N connection matrix switch, the administration subsystem must be functional to send individual switching commands to each of the devices. In the event of widespread system failure or remapping, communication of these individual commands can cause interruption of service for an extended period of time.

A similar problem may be encountered with any other M×N switch, or in any application where a large number of commands need to be sent to a large number of discrete locations, particularly where the discrete locations receive commands through a communications network. In this regard, a network is defined to include any communications system wherein a large number of discrete locations or devices are connected by a commonly-used communications medium, including but not limited to copper-wire conductors, fiber-optic conductors, or broadcast radio-frequency electromagnetic radiation.

SUMMARY OF THE INVENTION

Therefore, a need has arisen for a system and method for data transmission that provides for optimization of data transfer between locations or devices. More specifically, a data transmission optimization system and method is desirable to allow a plurality of commands to be transmitted to a plurality of discrete locations or devices efficiently and expediently.

Accordingly, one aspect of the present invention is a system for optimizing data for transmission that includes a data collector operable to collect a plurality of data packets, wherein each data packet includes an address label, a data assembler operable to order the data packets by address label and assemble all data packets with a common address label into a single data block with a single address label, and a transmitter for transmitting the data blocks, wherein the transmitter is operable to broadcast the data blocks.

Another aspect of the present invention is a system for transmitting data that includes a first data collector that receives a plurality of first data packets, each first data packet containing an input port identifier and an output port identifier for an M×N switch having M input ports and N output ports, wherein the data collector is operable to output a future state of the M×N switch. The M×N switch is comprised of a plurality of discrete devices having different addresses and is operable to connect any of the M input ports to any of the N output ports. The system also includes a connection engine operable to receive the future state of the M×N switch and to output a required sequence of commands to go from a present state of the M×N switch to the future state of the M×N switch, and a second data collector operable to receive the required sequence of commands and to output each command into a second data packet having an address label. A data assembler is operable to receive the second data packets, order the second data packets by address label, and assemble all second data packets with a common address label into a single data block with a single address label.

A third aspect of the present invention is a method for transmitting data that includes the steps of collecting a plurality of data packets, wherein each data packet containing an address label, assembling all data packets with a common address label into a single data block having a single address label, and transmitting the data blocks.

Yet another aspect of the present invention is a method for transmitting data that includes the steps of receiving a plurality of first data packets, each data packet containing an input port identifier and an output port identifier for an M×N switch having M input ports and N output ports, wherein the M×N switch is operable to connect any of the M input ports to any of the N output ports, and outputting a future state of the M×N switch. Next, the required sequence of commands to go from a present state of the M×N switch to the future state of the M×N switch is determined, and each command is converted into a second data packet having an address label. The second data packets are ordered by address label, and all second data packets with a common address label are assembled into a single data block with a single address label.

One important technical advantage of the present invention is that the amount of data that must be transmitted over a communications medium is decreased by the elimination of redundant addressing information.

Another important technical advantage of the present invention is that the operating speed of any system that is limited by data transmission rates is improved significantly.

Yet another important technical advantage of the present invention is that it significantly improves the operating speed of a digital cross-connect system.

BRIEF DESCRIPTION OF THE DRAWINGS

For a more complete understanding of the present invention and advantages thereof, reference is now made to the following description taken in conjunction with the accompanying drawings, wherein like reference numerals represent like parts, in which:

FIG. 5 is an exemplary flowchart for a call routing procedure according to the teachings of the present invention for a digital cross-connect system;

FIG. 6 is an exemplary flowchart for a data transmission optimization process according to the teachings of the sent invention.

DETAILED DESCRIPTION OF THE INVENTION

In order to better describe the present invention, the invention will be applied to data transmission requirements for a DCC system. It is understood that the invention may also be applied in a variety of other applications that involve the transmission of data to a plurality of discrete locations or devices.

Figure 1:
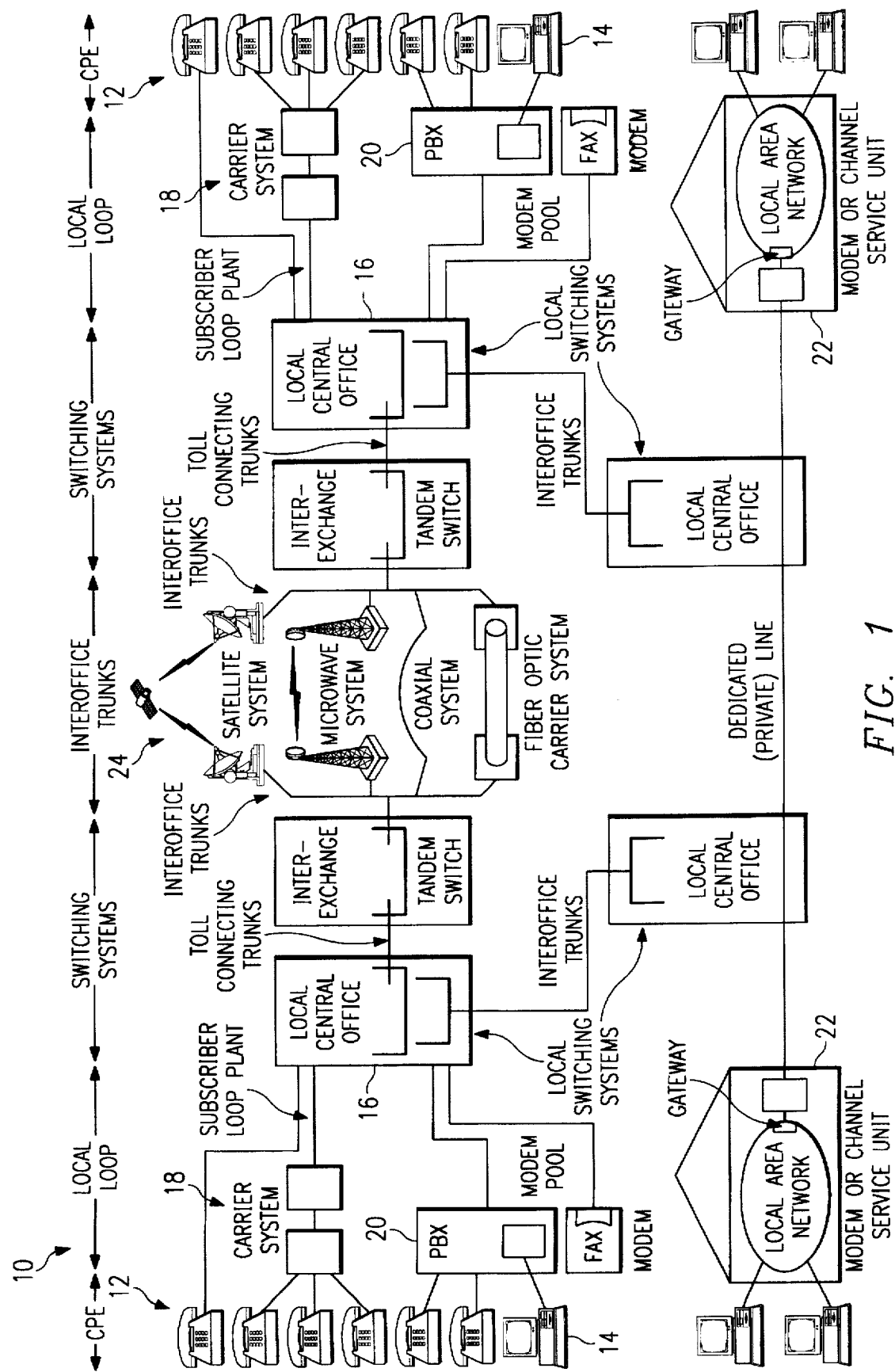
FIG. 1 shows an example of a modern telecommunications network.

FIG. 1 shows an example of modern telecommunications network 10. A plurality of telephones 12 or digital data stream sources 14 are connected to local central office 16 through carrier system 18, private branch exchange 20, local area network 22, or other distributed communications data sources. Local central office 16 is functional to connect subscribers operating within local central office 16 and is further functional to connect subscribers from local central office 16 to other subscribers through interoffice trunks 24. Interoffice trunks 24 may include satellite systems, microwave systems, coaxial systems, and fiber optic carrier systems. A DCC system is typically used at local central office 16, but may also be used at carrier system 18, private branch exchange 20, or other locations that are not explicitly shown in FIG. 1.

Figure 2:
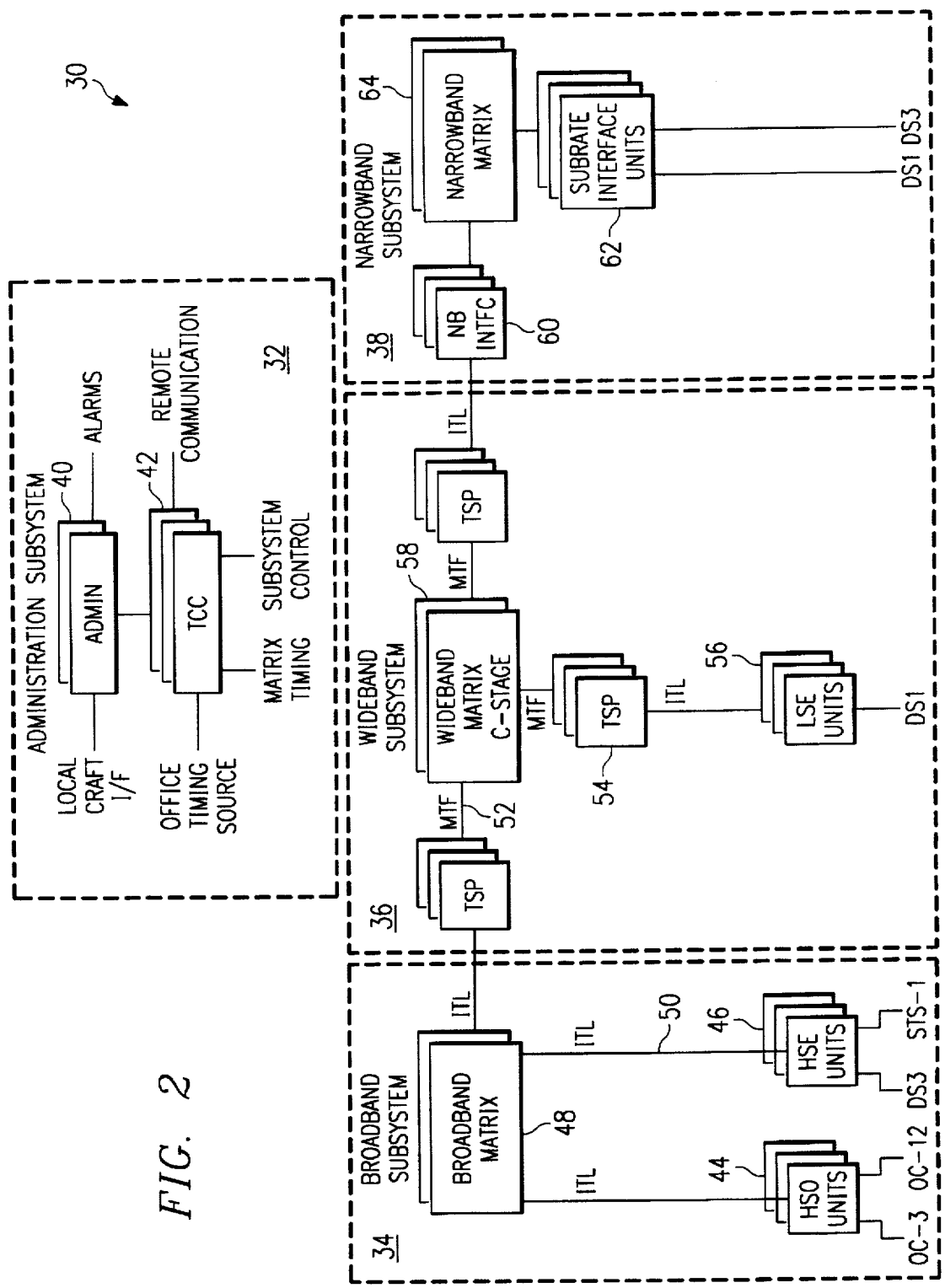
FIG. 2 shows an exemplary high level system architecture for a digital cross-connect system.

FIG. 2 presents a high level system architecture of a DCC system 30. DCC system 30 provides an integrated platform for cross-connecting signals at broadband, wideband, and narrowband levels and supports cross-connection of both domestic and international rates and formats. For purposes of this description, discussion is limited to domestic signaling at DS0, DS1, DS3, STS-1, OC3, and OC12 rates, though DCC system 30 may also process signals at other rates.

DCC system 30 terminates synchronous optical (OC3, OC12), synchronous electrical (STS-1), and asynchronous electrical (DS3, DS1) network signals. Cross-connection is provided via a multi-rate, multi-subsystem architecture that insures maximum flexibility at all network levels. With multiple subsystems under a single administration control, DCC system 30 manages individual high capacity, non-blocking matrix subsystems in order to perform cross-connections. DCC system 30 includes an administration subsystem 32 and matrix subsystems including a broadband subsystem 34, a wideband subsystem 36, and a narrowband subsystem 38.

Administration subsystem 32 includes an administration unit 40 and a timing/communication controller (TCC) unit 42. Administration unit 40 performs operations, administration, maintenance, and provisioning (OAM&P) functions for DCC system 30. Administration unit 40 also provides communications interfaces to users and with central office discrete signals. Administration unit 40 handles system control for DCC system 30 through a hierarchical distribution scheme among the various components of the system, as described below.

Timing/communications controller (TCC) unit 42 provides communications and timing functions for DCC system 30. TCC unit 42 may receive an office timing source to generate the internal timing for synchronizing broadband subsystem 34, wideband subsystem 36, and narrowband subsystem 38. TCC unit 42 further controls each component within DCC system 30 through an hierarchy of controllers as supervised by administration unit 40. Timing synchronization may also be derived from network signals for distribution to each subsystem. Synchronization and control information from administration unit 40 are distributed throughout DCC system 30 by TCC unit 42.

Broadband subsystem 34 includes high speed optical (HSO) units 44 and high speed electrical (HSE) units 46 that are coupled to broadband matrix unit 48. Broadband system 34 supports network termination of signals including DS3, STS-1, OC3, and OC12 signals as well as international termination capability. These signals are terminated onto HSE 46 and HSO 44. Internal transmission links (ITLs) 50 are coupled from HSE 46 and HSO 44 to broadband matrix 48, and carry optical signals between broadband matrix 48 and HSE 46 and HSO 44. ITLs 50 permit flexibility in physical arrangement and location of DCC system 30 components.

Wideband subsystem 36 includes low speed electrical (LSE) units 56 and TSP units 54 that are coupled to a wideband matrix center stage 58. Wideband subsystem 36 supports network termination of signals including DS3 and DS1 as well as international termination capability. Network signals are cross-connected through wideband subsystem 36 in an internal matrix transport format.

Wideband signals are cross-connected at VT1.5 through VT6 rates into internal synchronous channels 52 having a wideband matrix transport format (MTF) of a matrix payload envelope capable of carrying the VT-rated signal. Higher rate network signals including DS3 and STS-1 discussed in conjunction with broadband subsystem 34 will normally access wideband subsystem 36 for tributary access or switching through broadband subsystem 34 over ITLs 50 and tributary signal processing (TSP) unit 54.

Narrowband subsystem 38 includes narrowband interface units 60 and subrate interface units 62 that are coupled to narrowband matrix unit 64. Narrowband subsystem 38 signals may be cross-connected at a DS0 rate. An optional subrate interface unit 62 provides direct electrical termination of signals at the DS1 and DS3 rates. However, instead of direct signal termination, narrowband subsystem 38 normally accesses network traffic through wideband subsystem 36.

DCC system 30 may also use redundant data paths in coupling each component together to increase operational reliability. Each subsystem may be organized in dual independent planes with no cross-coupling within the planes. In this configuration, each unit within each subsystem has access to both planes and is capable of independently selecting an active plane. Thus, a number of failures can be accommodated in both planes without loss of network traffic.

Figure 3:
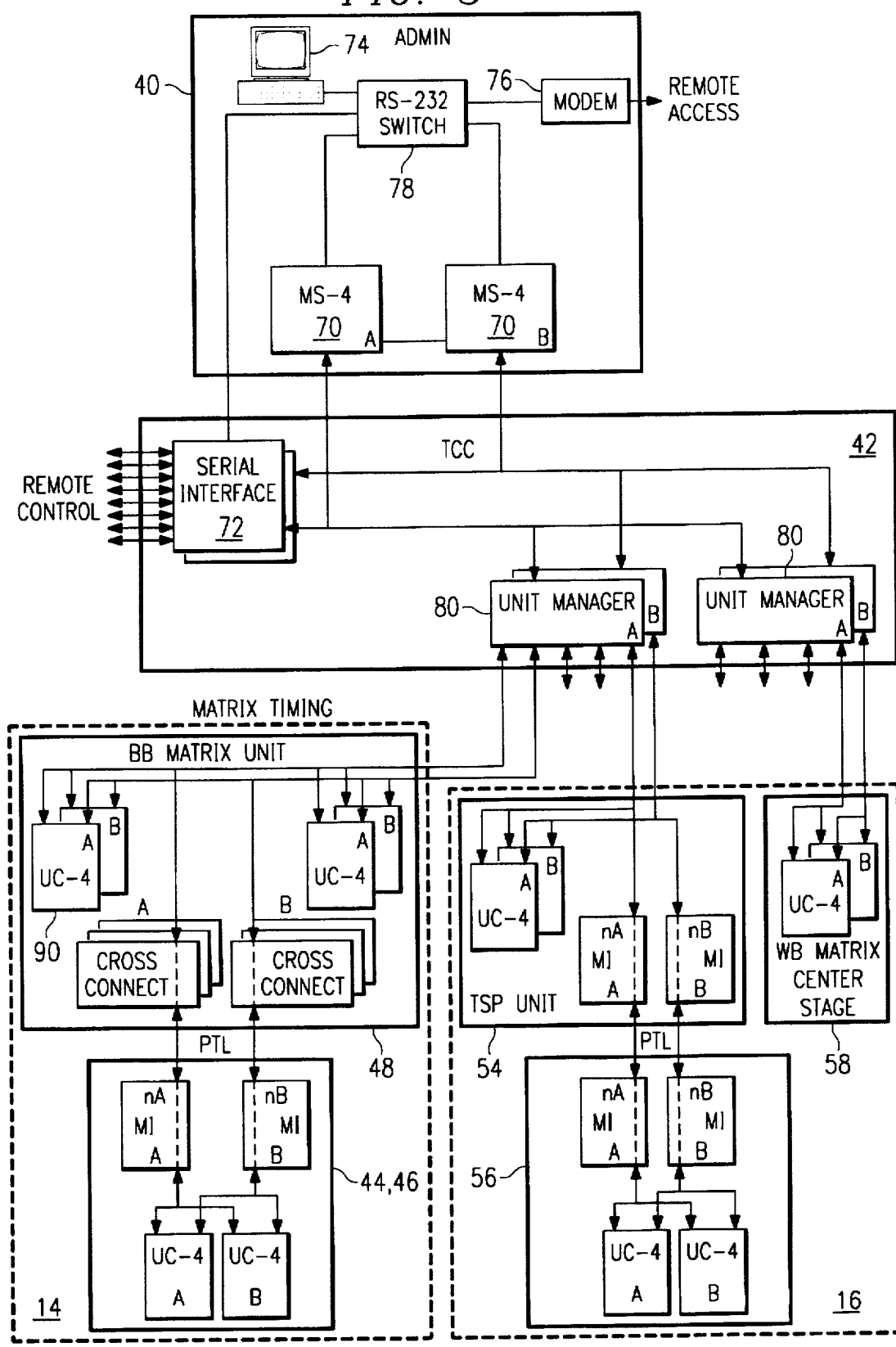
FIG. 3 is an exemplary high level block diagram of a control structure for a digital cross-connect system.

FIG. 3 is a high level view of the control structure for DCC system 30. Top level control is found within administration unit 40 of administration subsystem 32. Administration unit 40 includes redundant processors 70 to provide the platform to perform OAM&P functions. Processors 70 perform the monitoring and control for DCC system 30. Processors 70 interface with central office discrete signals through a serial interface 72 to perform top level monitoring and control for DCC system 30. Maintenance access to processors 70 is accomplished either through a local terminal 74 or by remote access through a modem 76. An RS232 switch 78 determines whether access to processors 70 is by local or remote terminals.

The second tier in the control hierarchy is the configuration of unit managers 80 found within timing/communications control unit 42. Unit managers 80 may be used individually or in parallel to provide a redundant communications and control path between processor 70 and the third level of the control hierarchy. Intra-system control information is sent from administration unit 40 to unit managers 80. Unit managers 80 provide intermediate level OAM&P functions. Communications between processors 70 and unit managers 80 may be accomplished by a network, such as a redundant Ethernet local area network (LAN). Serial interface 72 provides communications between an external source and processors 70 and unit managers 80.

The third tier of the control hierarchy is performed by unit controllers 90 located in each component of broadband subsystem 34, wideband subsystem 36, and narrowband subsystem 38. Unit controller 90 controls and monitors functions provided by the associated matrix units and performs the low level OAM&P function. Control information transmitted between unit managers 80 and unit controllers 90 may be carried on ITLs 50 or through direct cabling connections as determined by local constraints. Redundant unit controllers 90 may be found in all components of each subsystem including HSO units 44, HSE units 46, broadband matrix unit 48, LSE 56, TSP 54, and wideband center stage matrix 58.

Thus, processors 70 are connected through ITLs 50 to unit managers 80 which are connected through ITLs 50 to unit controllers 90 within broadband matrix unit 48, HSO units 44, HSE units 46, LSE units 56, and TSP units 54. Although individual unit controllers 90 and unit managers 80 contain software that controls their individual function, coordination of all components is performed by software within processors 70 in administration unit 40.

Because of the complexity of DCC system 30, the system-controlled software that runs on controllers 70 in administration unit 40 is one of the most important components of DCC system 30. Many configurations of this software are possible. For example, some software packages that may be required to run on processors 70 and administration unit 40 include software for user interface and validation, software for connection setup, software for control of the hardware components individually or as a coordinated system, and software for determining connections between the broadband, wideband, and narrowband cross-connect matrices.

Figure 4:
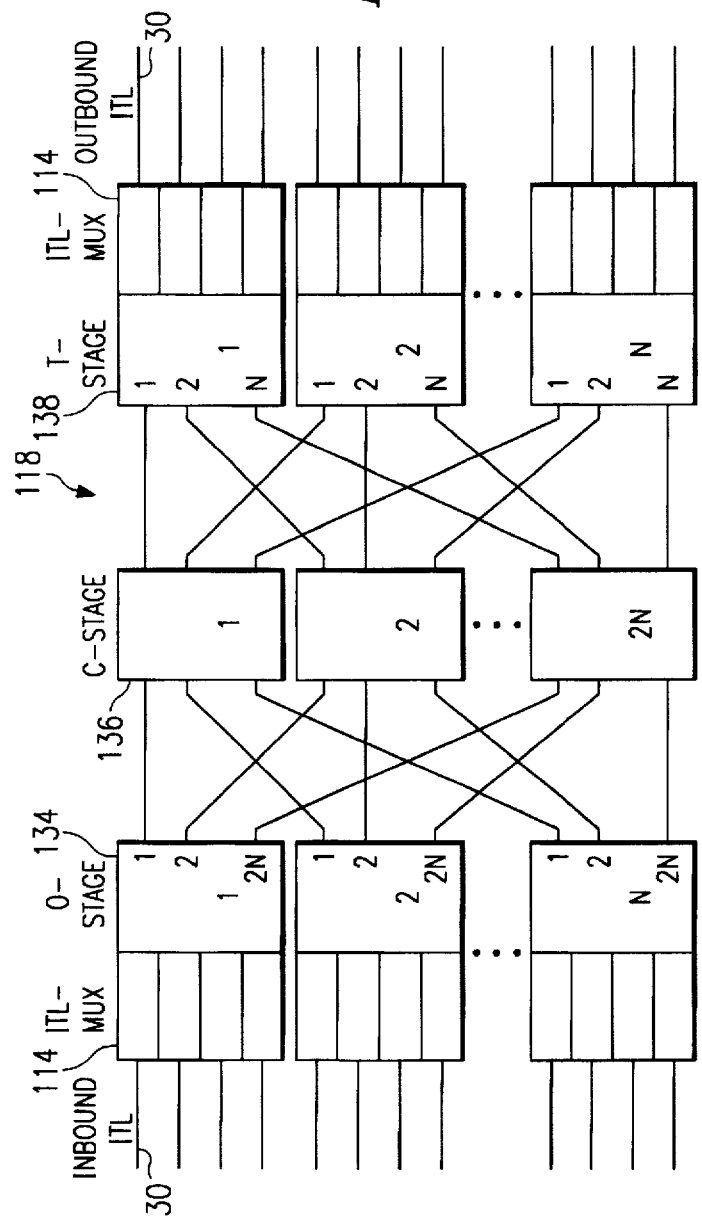
FIG. 4 is a block diagram of a cross-connect matrix.

FIG. 4 shows a block diagram of cross-connect matrix 118. Cross-connect matrix 118 uses a three-stage architecture capable of switching M input ports to N output ports. The three matrix stages for cross-connect matrix 118 are designated as originating stage 134, center stage 136, and terminating stage 138. ITL multiplexers (ITL-MUXs) 114 directly connected to originating stage 134 and terminating stage 138 of cross-connect matrix 118. Connections are made from originating stage 134 and terminating stage 138 to center stage 136.

Administration unit 40 receives routing data for cross-connect matrix 118 through RS-232 switch 78 from serial interface 72, local terminal 74, or modem 76. The connections made within cross-connect matrix 118 are constantly changing. Therefore, administration unit 40 and processor 70 must be functional to continuously update the connections made between the M input ports and the N output ports of cross-connect matrix 118.

In DCC system 30, cross-connect matrix 118 of FIG. 4 may be a 2N Clos matrix, which may be used to insure non-blockage for connections between the M input ports and the N output ports. A matrix solver (not explicitly shown) that determines the required connections that must be made in order to successfully connect the M matrix input ports to the corresponding N matrix output ports may be referred to as a Clos matrix engine. The present invention relates to the transmission of messages from processor 70 of administration unit 40 to individual unit controllers 90.

For example, FIG. 5 illustrates a simplified exemplary call routing procedure for DCC system 30. At block 120, administration unit 40 receives call routing data through RS-232 switch 78 from serial interface 72, local terminal 74, or modem 76. At block 122, a data collector in administration unit 40 collects the call routing data. At block 124, a switch state analyzer in administration unit 40 determines the appropriate input port to output port connections that are required at block 124. These connections may be referred to as the state of the switch. The switch state analyzer transmits the future state of the switch that is required by the collected routing data to a matrix connection processor at block 126. The matrix connection processor may be a Clos matrix solver or other similar matrix connection solver. The matrix connection processor either receives the present state of the switch or retrieves the present state of the switch from a memory location at block 128. The matrix connection processor then determines the correct sequence of switching events required by the individual components of cross-connect matrix 118 in order to change the state of the switch from the present state to the future state. When the sequence of switching events has been determined, the sequence of events is transmitted to the data transmission optimization processor at block 132.

A flowchart for the data transmission optimization processor is shown in FIG. 6. At block 140, the sequence of switching events is received by the data transmission optimization processor. The processor then orders the switching events by physical device location at block 142. For example, each switching event may require the connection of an input port to an output port, or the disconnection of an input port from an output port. The associated command may thus include an input port ID, an output port ID, and an action indicator, such as "connect" or "disconnect." The data transmission optimization processor retrieves the physical device associated with a given port from a memory location at block 144, and groups the switching events by device at block 146. At block 148, the data transmission optimization processor concatenates the list of input ports by eliminating port IDs that are contiguous between two port IDs. For example, if the list of input ports includes "11-12-13-14" the data transmission optimization processor may concatenate the list to "11-X-14," where "X" indicates that all ports are used between the beginning and end of the list.

At block 150, the data transmission optimization processor concatenates the list of output ports in a manner similar to the input port optimization, if possible. At block 152, the data transmission optimization processor groups the commands into groups of "connect" commands and "disconnect"

commands and eliminates redundant commands, such as where a switch would be disconnected in the process of making a new connection. At block 154, a command data packet is compiled that includes the device address and the list of commands needed for that device. At block 156, the commands are broadcast to unit controllers 90 through unit managers 80. Unit managers 80 may be programmed to transmit only those messages required by those unit controllers 90 associated with each unit manager, or unit managers 80 may be programmed to transmit all messages to all unit controllers 90. Each unit controller 90 is programmed to ignore all messages except those addressed to any particular unit controller 90. Other data optimization techniques may be used at blocks 148 and 150, depending upon the structure of data received.

Figure 7:
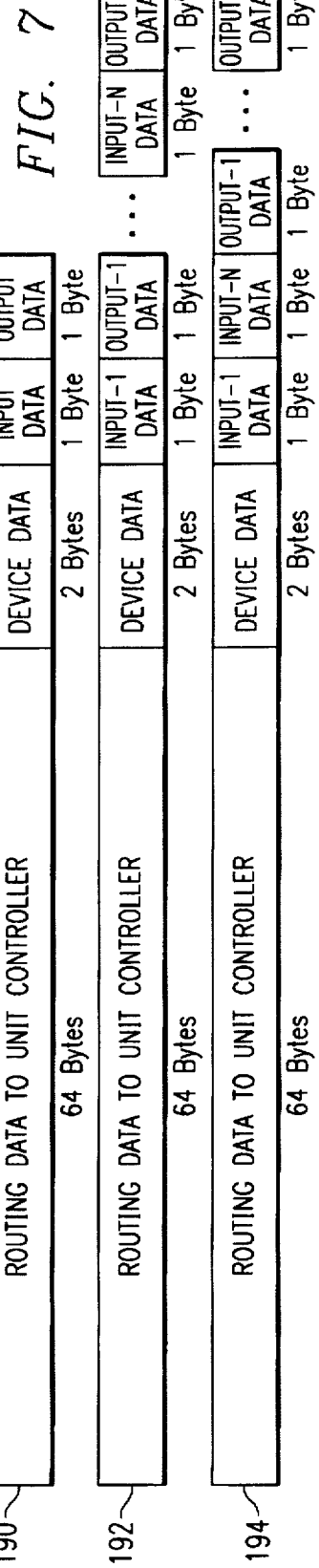
FIG. 7 is exemplary data structures showing transmission optimization that can be realized by the present invention.

FIG. 7 shows an example of the data transmission optimization that can be realized by the present invention. Under standard control data structure 190, where one message is required for each command, the routing data required to get the 4 byte message to the correct destination may be 64 bytes or more. Using control data structure 192 or 194 of the present invention, only a single 64 byte address block is required for all of the commands going to a single device. Thus, if a device would typically receive 48 commands, it would require 3,264 bytes of data using existing methods of data transmission. The present invention would allow the same amount of data to be transmitted with a single command that contains no greater than 256 bytes of data, thus achieving the same data transfer with less than 8 percent of the current data transmission requirements, and less than 2.1% of the current messaging (addressing) requirements.

A DCC system is but one example of the many applications where the present invention may be implemented to optimize data transmission. Other potential applications that could benefit from optimization of data transfer to a plurality of discrete locations over a common communications medium may be found in other telecommunications applications, data processing applications, industrial controls applications, electric power transmission and distribution applications, and numerous other applications.

Although the present invention has been described in detail, it should be understood that various changes, substitutions, and alterations can be made hereto without departing from the spirit and scope of the invention as determined by the appended claims.

What is claimed is:

1. A system for optimizing data for transmission comprising:
a data collector operable to collect a plurality of data packets, wherein each data packet includes an address label;
a data assembler operable to order the data packets by address label and assemble all data packets with a common address label into a single data block with a single address label; and
a transmitter for transmitting the data block, wherein the transmitter is operable to broadcast the data block.

2. The system of claim 1 wherein the data collector receives a plurality of first data packets, each first data packet containing an input port identifier and an output port identifier for an M×N switch having M input ports and N output ports, the data collector operable to output a future state of the M×N switch, wherein the M×N switch is comprised of a plurality of discrete devices having different addresses and is operable to connect any of the M input ports to any of the N output ports.

3. The system of claim 2 further comprising a connection engine operable to receive the future state of the M×N switch and to output a required sequence of commands to go from a present state of the M×N switch to the future state of the M×N switch.

4. The system of claim 3 further comprising a second data collector operable to receive the required sequence of commands and to output each command into a second data packet having an address label.

5. The system of claim 1 further comprising one or more switching matrices, each switching matrix having one or more distributed control devices, each distributed control device operable to receive the transmitted data block.

6. The system of claim 1 further comprising one or more switching matrices, each switching matrix operable to receive switching commands from a centralized administration system, each switching matrix having one or more distributed control devices, each distributed control device operable to receive the transmitted data block.

7. A system for transmitting data comprising:
a first data collector that receives a plurality of first data packets, each first data packet containing an input port identifier and an output port identifier for an M×N switch having M input ports and N output ports, the data collector operable to output a future state of the M×N switch, wherein the M×N switch is comprised of a plurality of discrete devices having different addresses and is operable to connect any of the M input ports to any of the N output ports;
a connection engine operable to receive the future state of the M×N switch and to output a required sequence of commands to go from a present state of the M×N switch to the future state of the M×N switch;
a second data collector operable to receive the required sequence of commands and to output each command into a second data packet having an address label; and
a data assembler operable to receive the second data packets, order the second data packets by address label, and assemble all second data packets with a common address label into a single data block with a single address label.

8. The system of claim 7, further comprising a transmitter that transmits the data block to the discrete devices, wherein the transmitter is operable to broadcast the data blocks to all discrete devices.

9. A method for transmitting data comprising:
collecting a plurality of data packets, each data packet containing an address label;
ordering all data packets with common address labels into separate groups each having a single data address label;
assembling each separate group into a single data block; and
transmitting the data block.

10. A method for transmitting data comprising:
collecting a plurality of data packets, each data packet containing an address label;
assembling all data packets with a common address label into a single data block having a single address label; and
transmitting the data block, wherein assembling the data blocks further comprises;
ordering the plurality of data packets into groups with common address labels;
separating the address label from each of the data packets in each group;

combining the data packets without address labels into a single data block;

appending the address label onto each data block; and transmitting the data block and appended address label.

11. The method of claim 10, wherein transmitting the data block and appended address label includes broadcasting the data block and appended address label to one or more devices.

12. The method of claim 10, wherein transmitting the data block and appended address label includes broadcasting the data block and appended address label over a network.

13. The method of claim 10, wherein each data block contains information on the input ports of an M×N switch.

14. A method for transmitting data comprising:

receiving a plurality of first data packets, each data packet containing an input port identifier and an output port identifier for an M×N switch having M input ports and N output ports, wherein the M×N switch is operable to connect any of the M input ports to any of the N output ports;

outputting a future state of the M×N switch;

determining the required sequence of commands to go from a present state of the M×N switch to the future state of the M×N switch;

converting each command into a second data packet having an address label;

ordering the second data packets by address label; and assembling all second data packets with a common address label into a single data block with a single address label.

15. The method of claim 14, further comprising transmitting the data block to one or more discrete devices.

16. The method of claim 15 wherein the M×N switch is comprised of the one or more discrete device.

17. The method of claim 14, further comprising broadcasting the data block to one or more discrete devices.

18. The method of claim 7 wherein the M×N switch is comprised of the one or more discrete devices.

19. The method of claim 14, further comprising broadcasting the data block to one or more discrete devices over a network.

20. The method of claim 19 wherein the M×N switch is comprised of the one or more discrete devices.

21. The method of claim 14 further comprising transmitting the data block to one or more distributed control devices in a system with one or more switching matrices.

22. The method of claim 14 further comprising broadcasting the data block over a network to one or more distributed control devices in a system with one or more switching matrices.

* * * * *